(12) United States Patent
Liu et al.

(10) Patent No.: US 11,827,429 B2
(45) Date of Patent: Nov. 28, 2023

(54) TRAY FEEDING BOX

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Eddy Liu, New Taipei (TW); Han Yang, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 484 days.

(21) Appl. No.: 17/091,354

(22) Filed: Nov. 6, 2020

(65) Prior Publication Data
US 2022/0063860 A1 Mar. 3, 2022

(30) Foreign Application Priority Data
Sep. 3, 2020 (CN) .......................... 202010915741.8

(51) Int. Cl.
*B65D 5/10* (2006.01)
(52) U.S. Cl.
CPC .......... *B65D 5/103* (2013.01); *B65D 2585/86* (2013.01)

(58) Field of Classification Search
CPC ...... B65D 5/103; B65D 2585/86; B65D 5/16; B65D 5/42; B65D 5/08; B65D 5/6605; B65D 5/741; B65D 5/4204; B65D 5/0254; A01K 1/0125; B31B 50/00
USPC .............. 229/155, 117.17, 120.03, 122, 164; 119/168; 206/736, 769; 221/51, 71, 107, 221/174
See application file for complete search history.

(56) References Cited

U.S. PATENT DOCUMENTS

| | | | | |
|---|---|---|---|---|
| 4,986,217 A | * | 1/1991 | Robinson | A01K 1/0125 229/117.02 |
| 5,402,552 A | * | 4/1995 | Chen | E05D 3/022 16/286 |
| 7,059,272 B2 | * | 6/2006 | Helou | A01K 1/0125 119/168 |
| 11,618,608 B2 | * | 4/2023 | Sollie | B65D 5/4266 229/117.07 |
| 2008/0245849 A1 | * | 10/2008 | Mathieu | B65D 5/321 229/117.17 |

* cited by examiner

*Primary Examiner* — Christopher R Demeree
(74) *Attorney, Agent, or Firm* — ScienBiziP, P.C.

(57) ABSTRACT

A tray feeding box includes a box body; a cover, arranged at a first end of the box body; and a bottom board, arranged at a second end of the box body away from the cover. The cover includes at least one first cover arranged at the first end of the box body. The at least one first cover is defined with a first opening. The box body is defined with a take-out gap communicated with the first opening.

18 Claims, 4 Drawing Sheets

US 11,827,429 B2

TRAY FEEDING BOX

FIELD

The subject matter herein generally relates to automatic manufacturing technology, especially to a feed box.

BACKGROUND

SMT (surface mount technology) is a common technology and process in electronic assembly industries. During production processing using such technology, materials are needed to be frequently feed. The SMT tray is mainly packaged with standard paper boxes. During the production of SMT, it is needed to manually unpack the boxes and manually taking materials out of the boxes. Such processes cannot meet automatic equipment. Conventional automatic take-out devices usually use special automatic tools. However, such special automatic-tools may be high cost, have poor packaging function, which may not meet requirements of materials suppliers.

BRIEF DESCRIPTION OF THE DRAWINGS

Implementations of the present disclosure will now be described, by way of embodiment, with reference to the attached figures.

DETAILED DESCRIPTION

Figure 1:
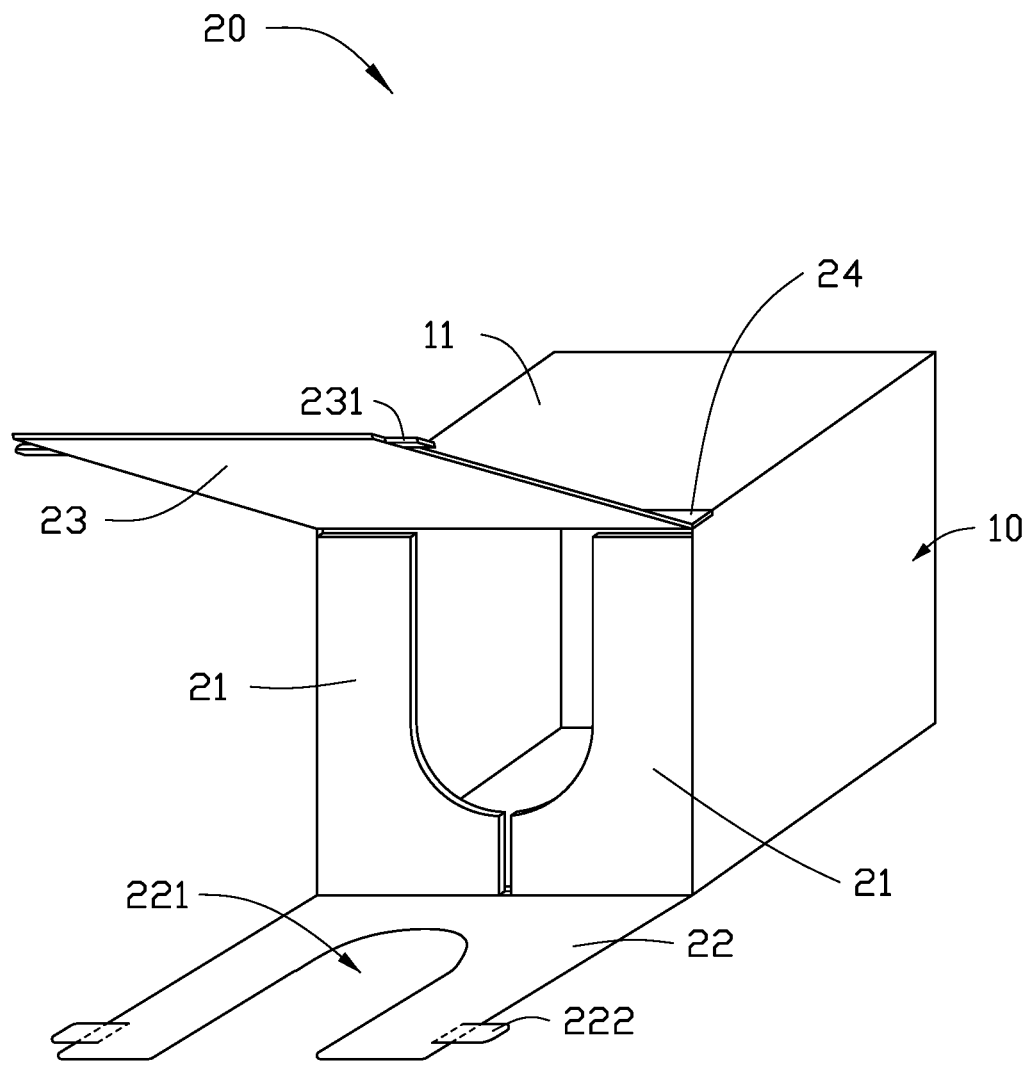
FIG. 1 is a schematic diagram of a tray feeding box according to a first embodiment of the present disclosure, the tray feeding box including a bottom board.

The embodiments of the present disclosure will be described clearly and completely below in combination with the accompanying drawings. Obviously, the described embodiment is only part of the embodiments of the present disclosure, not all of the embodiments. Based on the embodiments in the present disclosure, all other embodiments obtained by those skilled in the art without creative labor belong to the protection scope of the present application.

It should be noted that if a component is called "fixed" to another component, it can be directly or indirectly fixed to another component or indirectly fixed to another component by an intermediate component. If a component is considered to "connect" to another component, it can be directly connected to another component or indirectly connected to another component by an intermediate component. When a component is considered to be "arranged" on another component, it can be set directly to another component or indirectly arranged on another component by an intermediate component. The terms "vertical", "horizontal", "left", "right" and similar expressions indicating directions or positions are based on the directions or positions shown in the attached drawings in order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Unless otherwise defined, all technical and scientific terms used in the present disclosure have the same meanings as those generally understood by those skilled in the technical field of the application. The terms used in the specification of the present application are only for the purpose of description, and are not intended to limit the present application. The term "or/and" used in the present disclosure includes any one of and all combinations of two or more related listed items.

Some embodiments of the present disclosure are described in detail below in combination with the attached drawings. Without conflict, the following embodiments and features in the embodiments may be combined with each other.

The present disclosure provides a tray feeding box. The try feeding box includes a box body, a cover and a bottom board. The cover and the bottom board are arranged at two opposite ends of the box body respectively. The cover includes two first cover boards respectively arranged at two opposite sides of one of the two ends of the box body. Each of the first cover boards defines a half-opening. When the two first cover covers the end of the one of the two ends of the box body, the two first cover covers are substantially on a same plane, the half-opening of each first cover cooperates to constitute a first opening. The box body defines a take-out gap communicated with the first opening.

In the tray feeding box, the take-out gap is communicated with the first opening. Such arrangement allows an automatic take-out device enters the box body through the first opening and take out trays out from the box body through the take-out gap.

Some embodiments of the present disclosure will be described in detail in combination with attached drawings.

Figure 2:
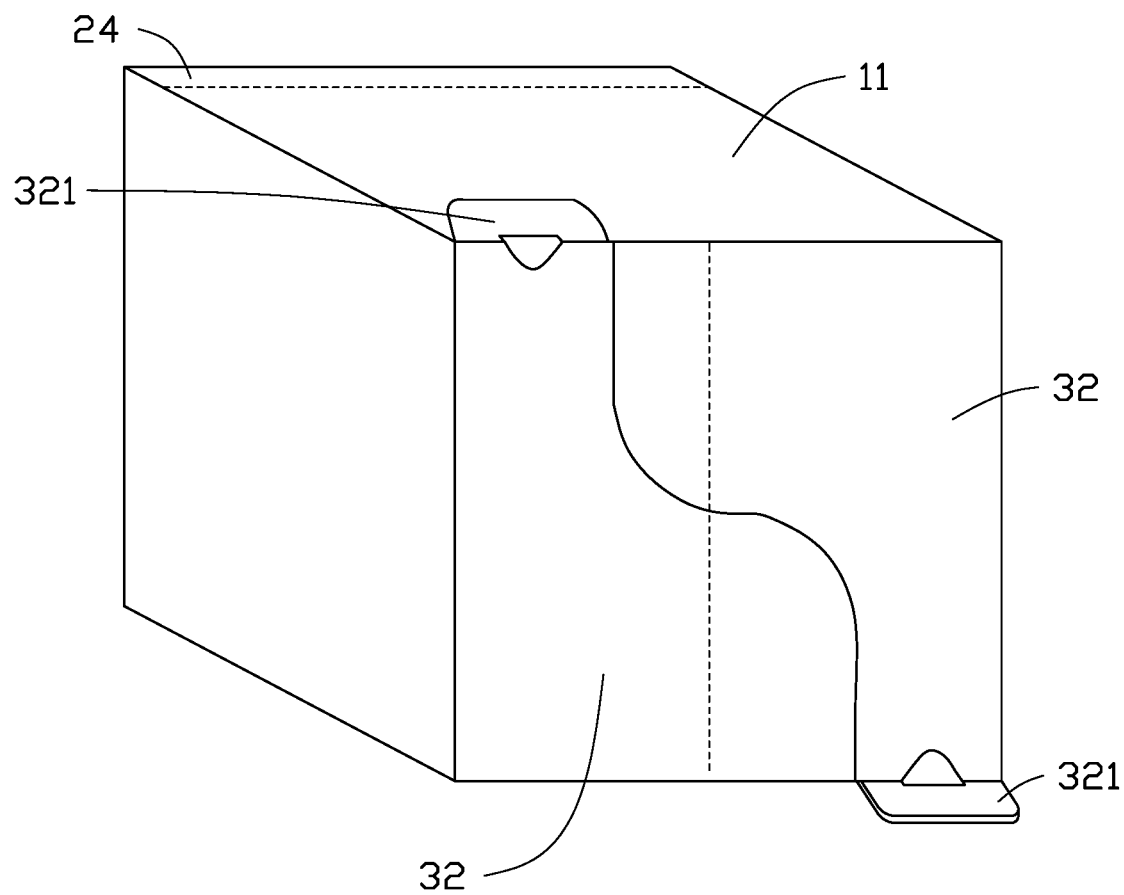
FIG. 2 is a schematic diagram of the bottom board of FIG. 1.

Referring to FIGS. 1 and 2, a tray feeding box 100 for storage of trays is provided. The tray feeding box 100 can be used with automatic take-out devices. The tray feeding box 100 includes a box body 10, a cover 20 rotatably arranged at an end of the box body 10, and a bottom board 30 arranged at another end of the box body 10. The box body 10, the cover 20 and the bottom board 30 constitutes an enclosed space for storing trays.

Figure 3:
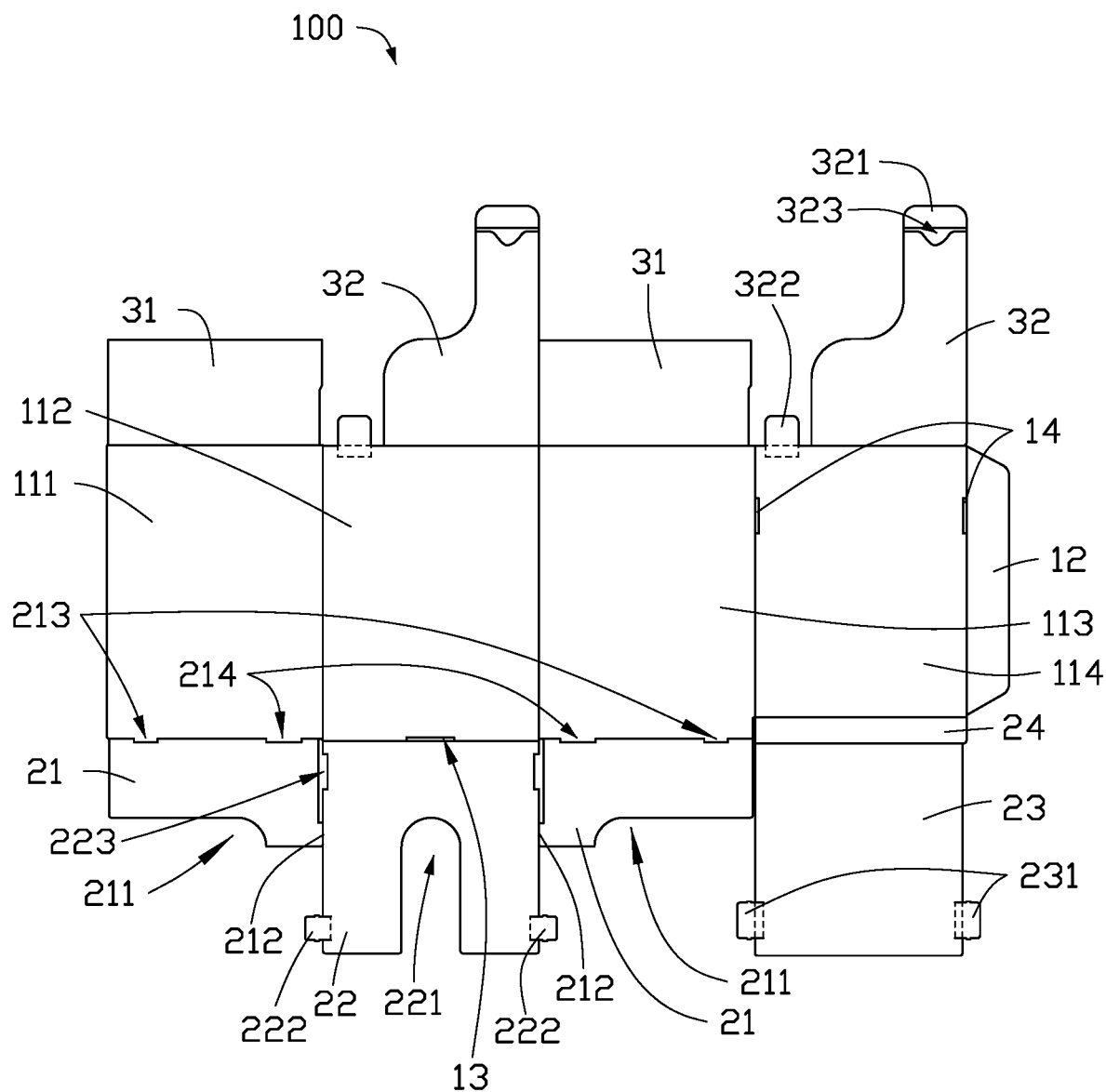
FIG. 3 is a schematic diagram of the tray feeding box of FIG. 1 in an unfolding state.

Referring also to FIGS. 1 and 3, the box body 10 includes sideboard assembly 11. The sideboard assembly 11 includes a first sideboard 111, a second sideboard 112, a third sideboard 113, and a fourth sideboard 114 connected in turn. The fourth sideboard 114 is provided with a first connecting part 12 connected with the first sideboard 111. The first sideboard 111, the second sideboard 112, the third sideboard 113, and the fourth sideboard 114 together forms the box body 10 which is open at two opposite ends. In at least one embodiment, the box body 10 is cuboid with the first sideboard 111 opposite to the third sideboard 113, and the second sideboard 112 opposite to the fourth sideboard 114.

Referring to FIGS. 1 and 3, the cover 20 includes two first covers 21 and a second cover 22. The first covers 21 are rotatably arranged at two opposite sides of a first end of the box body 10. Specifically, the two first covers 21 are arranged at the first sideboards 111 and the third sideboards 113 respectively. Each of the two first covers 21 defines a half-opening 211. When the two first covers 21 rotates to cover an opening at the first end of the box body 10, the two first covers 21 resists against each other and the half-opening 211 of each first cover 21 constitutes a first opening 215. The first opening 215 allows an automatic take-out device to go inside the box body 10 therethrough, so as to take out trays stored in the box body 10. In at least one embodiment, the automatic take-out device can be a robotic arm.

Each of the first covers 21 is provided with a first fastener 212. The second sideboard 112 defines at least one first groove 13 corresponding to the first fasteners 212. When the first covers 21 rotates to cover the box body 10, the first fastener 212 can be inserted into the first groove 13 to fix the first cover 20 at a closed state. In at least one embodiment, each first fasteners 212 is arranged on a side of the first covers 21 away from the half-opening 211. When the first cover 20 rotates to the closed state, the two first fasteners 212 are against each other and both inserted into the first groove 13. In at least one embodiment, the two first covers 21 can be interconnected by fasteners when the two first covers 21 rotates to the closed state, thereby improving stability of the first covers 21.

In at least one embodiment, two first covers 21 can be replaced with a whole first cover. The whole first cover is rotatably connected with the first sideboard 111 or the third sideboard 113, and defines the first opening 215 thereon.

The second cover 22 is rotatably connected with the sideboard assembly 11. Specifically, the second cover 22 is connected with the second sideboard 112. The second cover 22 defines a second opening 221 corresponding to the first opening 215. The second cover 22 can be rotated to a closed state at which the second cover 22 covers the first cover 21, so as to enhance structure strength of the first cover 21.

The second cover 22 is provided two second fasteners 222 at two opposite sides thereof. The first cover 21 is defined with two second grooves 213 respectively corresponding to the second fasteners 222. The second fasteners 222 can be inserted into the second grooves 213 respectively, so as to fix the second cover 22 and the first cover 21, thereby enhancing structure stability of the first cover 21.

In at least one embodiment, the second cover can be integral with the two first covers 21.

Figure 4:
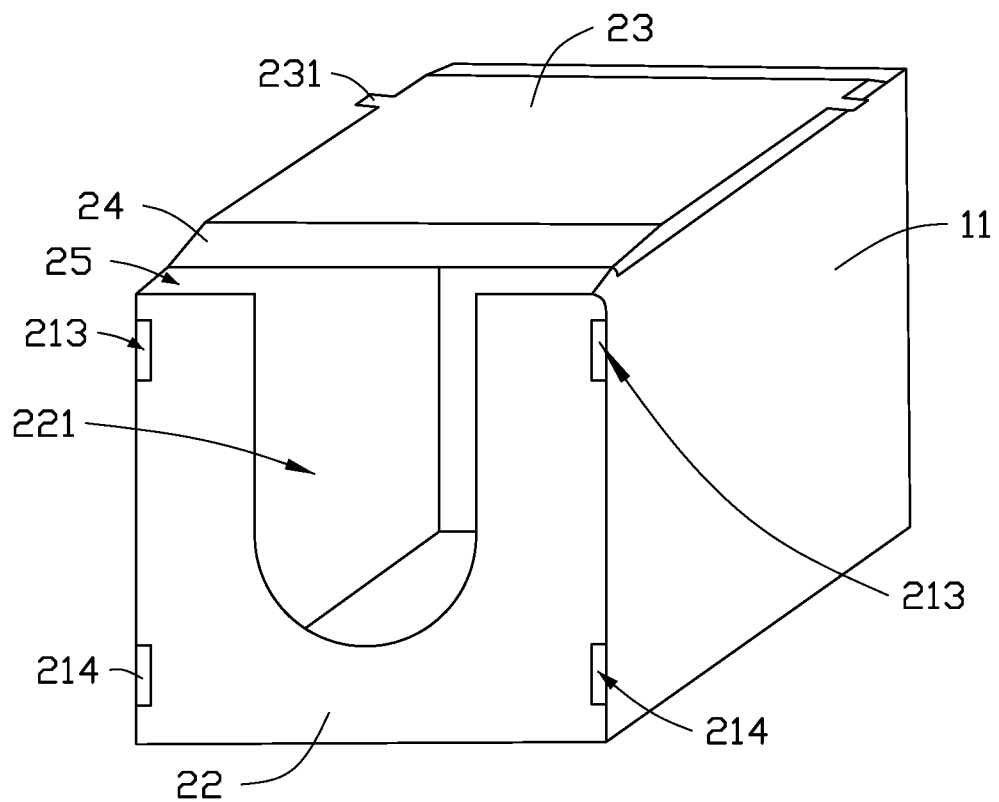
FIG. 4 is a schematic diagram of the tray feeding box of FIG. 1 in an open state.

Referring to FIGS. 1, 3 and 4, the box body 10 is defined with a take-out gap 25. The take-out gap 25 is communicated with the first opening 215. The automatic take-out device can enter the box body 10 through the second opening 221 and take trays out from the box body 10 from the take-out gap 25. Therefore, the trays can be automatically taken out from the box body 10.

The cover 20 further includes a rotatable board 23. The rotatable board 23 is rotatably connected with the sideboard assembly 11. Specifically, the rotatable board 23 is connected to the fourth sideboard 114. A connection joint between the rotatable board 23 and the fourth sideboard 114 is corresponding to an opening direction of the second opening 221. The rotatable board 23 is connected with the fourth sideboard 114 through a connecting board 24. That is, the connecting board 24 is connected between the rotatable board 23 and the fourth sideboard 114. The connecting board 24 is separated from the rotatable board 23 by a crease. The rotatable board 23 can rotate relative to the fourth sideboard 114 to bring the connecting board 24 to cover or expose the take-out gap 25, so as to open or close the box body 10 at the first end.

Referring to FIG. 4, specifically, when the rotatable board 23 rotates to an open state, the connecting board 24 rotates along with the rotatable board 23 and the take-out gap 25 is defined between the connecting board 24 and the first cover 21. Therefore, the automatic take-out device can enter the box body 10 through the second opening and take trays out from the box body 10 through the take-out gap 25. In at least one embodiment, a width of the connecting board 24 is equal to 1.5 times of a width of a tray, and a width of the take-out gap 25 is 1.5 times of the width of the tray. Therefore, the trays inside the box body 10 can be taken out one by one through the take-out gap 25.

The rotatable board 23 is provided with two third fasteners 231 at two opposite sides thereof. The fourth sideboard 114 is defined with two third grooves 14 respectively corresponding to the two third fasteners 231. When the rotatable board 23 rotates to bring the connecting board 24 to cover the fourth sideboard 114, the third fasteners 231 can be inserted into the third grooves 14 respectively to have the take-out gap 25 and the second opening 221 in an open state, thereby facilitating taking trays out from the box body 10.

When the rotatable board 23 rotates to cover the second cover 22 and the second opening 221, the connecting board 24 rotates along the rotatable board 23 to cover the take-out gap 25, thereby closing the box body 10 at the first end and facilitating carrying or storage.

The first cover 21 is defined with two fourth grooves 214, and the second cover 22 is defined with two slots 223. When the rotatable board 23 rotates to cover the second cover 22, the third fasteners 231 can be inserted into the fourth grooves 214 through the slots 223, thereby keeping the take-out gap 25 and the second opening 221 in a closed state.

In at least one embodiment, the rotatable board 23 can be replaced with other bonding element to cover or expose the take-out gap 25, so as to close or open the box body 10. The bonding elements can be an adhesive tape or a bonding plate.

Referring to FIGS. 2 and 3, the bottom board 30 includes two first bottom boards 31 and two second bottom boards 32. The first bottom boards 31 are arranged at a second end of the box body 10 away from the cover 20 and connected with the sideboard assembly 11. Specifically, the two first bottom board 31 are respectively connected with the first sideboard 111 and the third sideboard 113 away from the cover 20. When the two first bottom boards rotate to be on a same plane, they resist against each other and the two first bottom boards close an opening at the second end of the box body 10. In at least embodiment, the first bottom boards 31 are rectangular, and an area of the first bottom boards is equal to a half of an area of the opening at the second end of the box body 10.

The two second bottom boards 32 is arranged at the second end of the box body 10 and connected with the sideboard assembly 11. Specifically, the second bottom board 32 is connected with the second sideboard 112 and the fourth sideboard 114. The second bottom board 32 is provided with a second connecting part 321. Each of the second sideboard 112 and the fourth sideboard 114 is provided with a fourth fastener 322. Each fourth fastener 322 is arranged between the first bottom board 31 and the second bottom board 32. When the second bottom board 32 is rotated to cover the first bottom board 31, the fourth fastener 32 is fastened with a corresponding second connecting part 321. Specifically, the second connecting part 321 is defined with a fifth groove 323 corresponding to the fourth fastener 322. The fourth fastener 322 can be inserted into the fifth groove 323 to fix the bottom board 32 at the box body 10. The second connecting part 321 is rotatable to be fixed at the second sideboard 112 and the fourth board 114.

In the embodiment illustrated in FIG. 3, the second bottom board 32 extends from an end where the second connecting part 321 is arranged to an end connecting the second sideboard 112 and the fourth sideboard 114 in an arc from narrow to wide. The two second bottom boards 32 together constitute a flat structure to cover the opening at the second end of the box body 10. It can be understood that, in at least one embodiment, the second bottom board 32 can be any suitable structure or shape that can cover the opening at the second end of the box body 10. For example, the second bottom board 32 extends from the end where the second connecting part 321 is arranged to the end connecting the second sideboard 112 and the fourth sideboard 114 along a straight line from narrow to wide.

The first bottom boards 31 cooperates with the second bottom boards 32 to close the opening at the second end of the box body 10. Compared with conventional assembly method with a fastener at one side of the box body, in the present disclosure, it is more stable and reliable with stronger bearing capacity by using the two fourth fasteners 322 and the two second connecting parts 321 to fix the bottom board 30 at the box body.

In at least one embodiment, the first opening 215 and the second opening 221 is U shaped. It can be understood that, in other embodiments, the first opening 215 and the second opening 221 can be square or in other shapes with one end thereof open.

In at least one embodiment, the tray feeding box 100 is formed by a cutting paperboard cut from an integral cardboard, and the cutting paperboard is bent along creases to form the box body 10, the cover 20 and the bottom board 30. It can be understood that the tray feeding box 100 can be made of paper, plastic, metal and other supportable materials. It can be understood that the tray feeding box 100 can be fixed by bonding or nailing in addition to being fixed with a clasp.

When the tray feeding box 100 is in use, one side of the cover 20 is used as a bottom surface of the tray feeding box 100. The automatic take-out device enters the box body 10 through the second opening 221 to grab the trays inside the box body 10, and then takes out the trays through the take-out gap 25. The trays stored in the tray feeding box 100 are successively dropped to the take-out gap 25 under gravity, thereby facilitating automatic take-out.

In the present disclosure, the connecting board 24 is rotated along with the rotatable board 23 to expose the take-out gap 25, thus, the automatic take-out device can enter the box body 10 through the second opening 221 to grab trays stored in the box body 10, and then take the trays out from the take-out gap. The connecting board 24 is rotated along the rotatable board 23 to cover the take-out gap 25 and the second opening 221 to close the box body 10.

It can be understood that ordinary person skilled in the art can make various other corresponding changes and deformations according to the technical concept of the present disclosure, and all such changes and deformations shall belong to the protection scope of the present application.

What is claimed is:

1. A tray feeding box, comprising:
a box body;
a cover, arranged at a first end of the box body; and
a bottom board, arranged at a second end of the box body away from the cover;
wherein the cover comprising at least one first cover, arranged at the first end of the box body; the at least one first cover comprises a first opening; the box body comprises a take-out gap communicating with the first opening; the cover further comprises a rotatable board at the first end of the box body and is rotatable to cover the first opening, the cover further comprises a connecting board arranged between the box body and the rotatable board, the connecting board is rotatable with the rotatable board between an open state and a closed state, wherein in the open state, a take-out gap is formed between the first cover and the connecting board in the open state, and the connecting part covers the take-out gap and the rotatable board covers the first opening to close the box body at the first end in the closed state.

2. The tray feeding box according to claim 1, wherein a number of the at least one first cover is one, the first cover comprises the first opening thereon.

3. The tray feeding box according to claim 1, wherein a number of the at least one first cover is two, each of the first covers is on a respective opposite side of the first end of the box body; each of the first covers comprises a half-opening, when two of the first covers are rotated to a same plane, the half-openings of the two first covers cooperatively form the first opening.

4. The tray feeding box according to claim 3, wherein the cover further comprises a second cover at the first end of the box body, the second cover comprises a second opening corresponding to the first opening, when the second cover is rotated to cover the first cover, the second opening is coincide with the second opening.

5. The tray feeding box according to claim 4, wherein each of the first opening and the second opening is U shaped.

6. The tray feeding box according to claim 4, wherein the box body comprises a plurality of sideboards connected in turn to form a column structure with two open ends, the two first covers are connected with two opposite sideboards, respectively, the second cover and the rotatable board are respectively connected with other two opposite sideboards.

7. The tray feeding box according to claim 6, wherein the first cover is comprises at least one first fastener, and a corresponding one of the sideboards comprises at least one first groove corresponding to the at least one first fastener, when two of the first covers are rotated to a same plane, the least one first fastener insertable into the least one first groove.

8. The tray feeding box according to claim 7, wherein a number of the at least one first fastener is two, and a number of the first groove is one, when two of the first covers are rotated to a same plane, each of the first fasteners is insertable into the first groove.

9. The tray feeding box according to claim 6, wherein the second cover comprises two second fasteners at two opposite sides thereof, the first cover comprises two second grooves respectively corresponding to the second fasteners, when the second cover is rotated to cover the first cover, each of the second fasteners is insertable into the second grooves.

10. The tray feeding box according to claim 6, wherein the rotatable board comprises two third fasteners at two opposite sides thereof, the box body comprises two third grooves respectively corresponding to the two third fasteners, when the rotatable board is rotated to expose the first opening, each of the third fasteners is insertable into the third grooves respectively.

11. The tray feeding box according to claim 10, wherein the first cover comprises two fourth grooves, and the second cover comprises two slots, when the rotatable board rotates to cover the second cover, each of the third fasteners is inserted into the fourth grooves through the slots, thereby the take-out gap and the second opening remain in a closed state.

12. The tray feeding box according to claim 1, wherein the bottom board comprises two first bottom boards and two second bottom boards, the two first bottom boards are respectively connected with two opposite sideboards of the box body, and the two second bottom boards are connected with other two opposite sideboards of the box body, respectively.

13. The tray feeding box according to claim 12, wherein the first bottom boards are rectangular, and an area of the first bottom boards is equal to a half of an area of a second opening at the second end of the box body.

14. The tray feeding box according to claim 12, wherein the second bottom board comprises two second connecting parts respectively, the box body comprises two fourth fasteners, each fourth fastener is between the first bottom board and the second bottom board, when the second bottom board is rotated to cover the first bottom board, the fourth fastener is fastenable with a corresponding one of the second connecting parts.

15. The tray feeding box according to claim 14, wherein each of the second connecting parts comprises a fifth groove corresponding to the fourth fastener, the fourth fastener is insertable into the fifth groove to fix the bottom board to the box body.

16. The tray feeding box according to claim 14, wherein each of the second bottom boards extends from an end where the second connecting part is arranged to an end connecting the box body from narrow to wide.

17. The tray feeding box according to claim 1, wherein the tray feeding box is formed by a cutting paperboard cut from an integral cardboard, and the cutting paperboard is bent along creases to form the box body, the cover and the bottom board.

18. The tray feeding box according to claim 1, wherein the tray feeding box is made of paper, plastic, or metal.

\* \* \* \* \*